E. N. LIGHTFOOT.
HEATING APPLIANCE.
APPLICATION FILED NOV. 15, 1915.
1,283,440.
Patented Oct. 29, 1918.
2 SHEETS—SHEET 1.
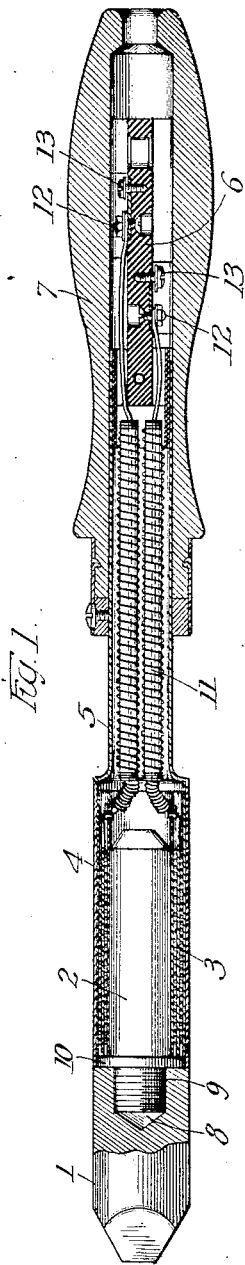
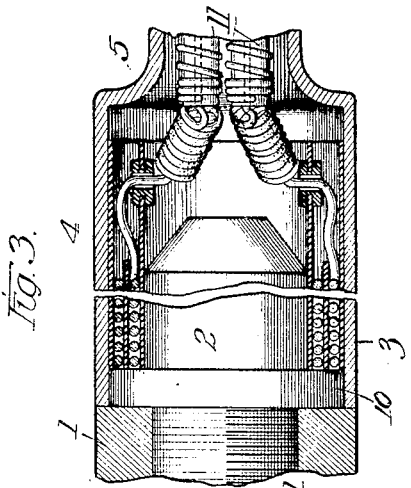
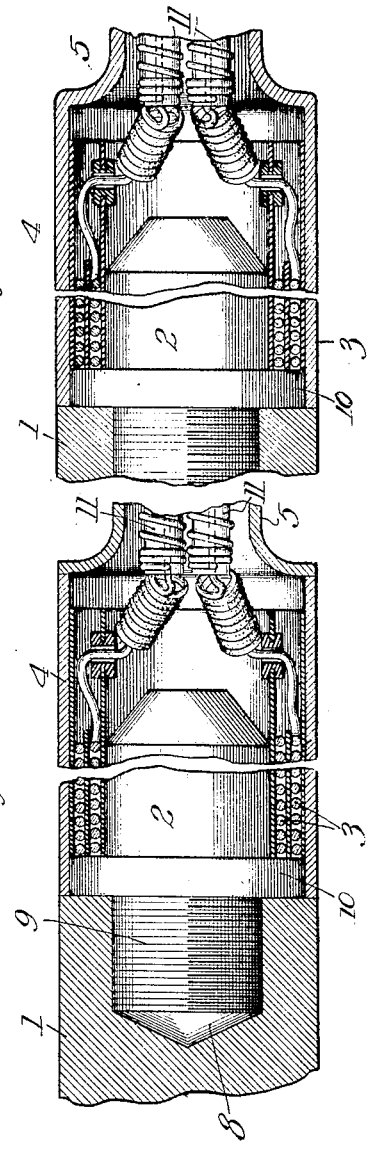
Witnesses:
Robert H. Weir
Arthur W. Carter
Inventor
Edwin N. Lightfoot
Edwin B. H. Tower Jr. Atty.

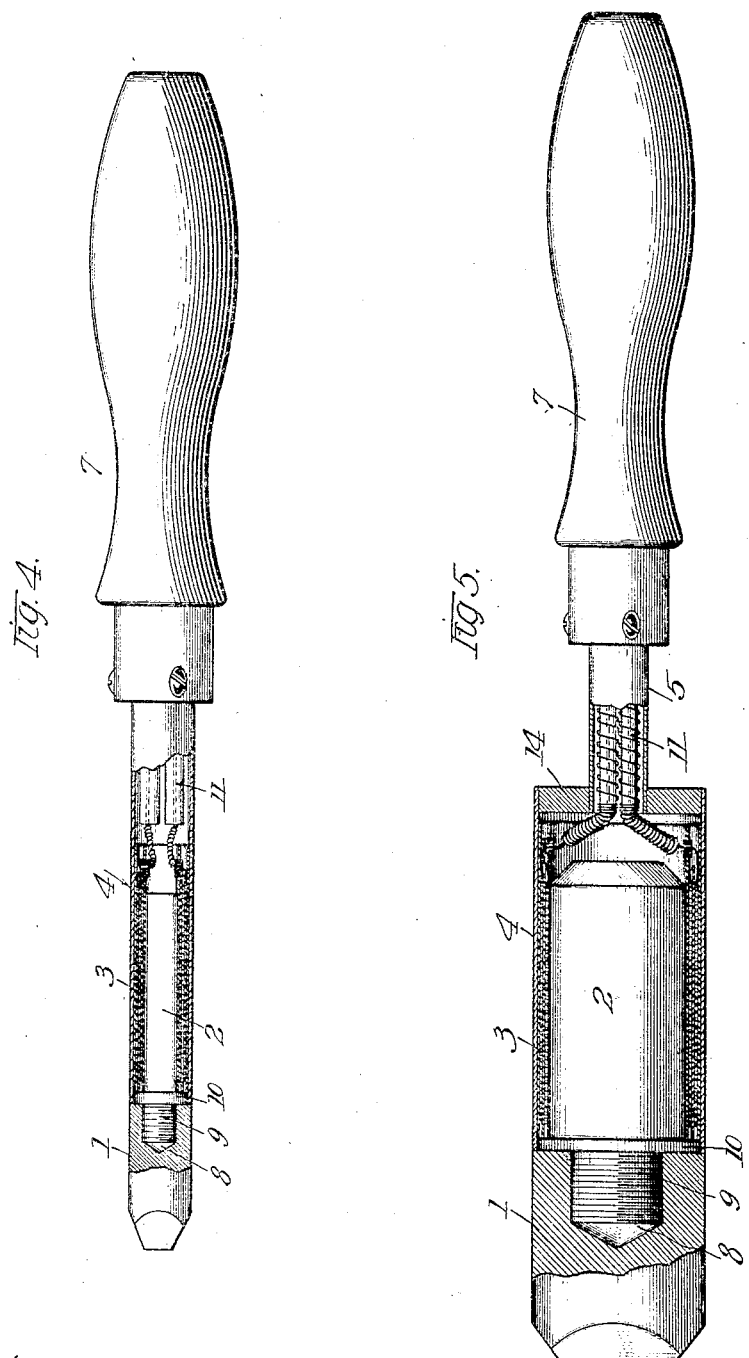

UNITED STATES PATENT OFFICE.

EDWIN N. LIGHTFOOT, OF NEW YORK, N. Y., ASSIGNOR TO THE CUTLER-HAMMER MFG. CO., OF MILWAUKEE, WISCONSIN, A CORPORATION OF WISCONSIN.

HEATING APPLIANCE.

1,283,440.  Specification of Letters Patent.  Patented Oct. 29, 1918.

Application filed November 15, 1915. Serial No. 61,654.

*To all whom it may concern:*

Be it known that I, EDWIN N. LIGHTFOOT, a citizen of the United States, residing at New York, in the county of Bronx and State of New York, have invented new and useful Improvements in Heating Appliances, of which the following is a specification.

This invention relates to electric heating appliances and is particularly adapted for use in such industrial tools as soldering irons.

Electric soldering irons are generally made of a plurality of parts which are joined together by soldering. It has been found that when the joints are soldered they corrode from the soldering acids, which finally eat through the joints to the heating element and damage the iron. Moreover, the joints become loose and expose the heating element to moisture.

It is important that a soldering iron be provided which is free from joints. It is further important that an iron be provided which may be inexpensively manufactured and readily assembled. To this end the present invention has been devised.

One of the objects of the invention is to provide an improved electric heating appliance such as a soldering iron and the like which will not deteriorate by reason of the methods and material used in its manufacture.

Another object is to provide an improved soldering iron which is free from soldered joints.

Another object is to provide a soldering iron in which the parts thereof are autogenously welded together.

A further object is to provide an iron which may be readily and inexpensively manufactured and assembled.

A further object is to provide a neat, compact and efficient electric soldering iron.

Other objects and advantages of the invention will hereinafter appear.

The accompanying drawings illustrate an embodiment of the invention.

The views of said drawings are as follows:

Figure I is a longitudinal-section of an iron embodying the invention.

Fig. II is an enlarged longitudinal-section of a portion of the iron shown in Fig. I before the parts thereof are united.

Fig. III is a longitudinal section of a portion of the iron after the parts are united.

Figs. IV and V are longitudinal-sections of modified forms of irons showing the parts before they are united.

The iron comprises, in general, a soldering tip 1, a heating stud 2, electric heating means 3, a casing 4, a shank 5, a terminal 6 and a handle 7.

The soldering tip 1 may be of any desirable shape and it is constructed of any suitable material, such as copper. It is generally provided with an opening 8 to receive the threaded end 9 of the heating stud 2.

The heating stud 2 which may be of any size or shape to suit the requirements of practice, acts as a heat storing and transferring means for receiving heat from the heating element 3 and transferring it to the soldering tip 1. The heating element 3 is in close thermal contact with the stud throughout its entire length so that heat is readily transferred thereto. The stud has considerable mass and accordingly acts as a heat reservoir for maintaining the soldering tip at a substantially uniform temperature. If desired the stud may be drilled out and provided with a copper core to increase the heat conductivity toward the tip. A flange 10 is formed on the forward end of the stud to which flange the casing 4 is attached as will be hereinafter described.

The electric heating means 3 comprises suitable heating conductors surrounding the heating stud 2. These conductors or heating elements are suitably insulated from the stud and from the casing 4 and may be formed so that the heating means can be removed as a unit from the iron. In the structure shown the conductors are wound in two layers on a cylindrical insulating core and they are reinforced at the end of the winding and brought out through insulating tubes 11 to the terminal block 6 where they are attached by means of binding screws 12.

The casing 4 is made in any suitable shape, preferably cylindrical. It is united to the flange 10 on the stud 2 and to the shank 5 thereby forming part of the body of the iron as well as forming a protective casing for the heating element.

The heating stud 2, the casing 4 and the shank 5 are parts which must be fastened together so that the iron may be handled as a unit. In the iron shown herein these parts are made out of like or similar materials, such as ingot iron, cold-rolled steel, seamless steel tubing, etc. The metals used need not be exactly alike by analysis, but they should be of the same character. For example, a cold-rolled steel core may be used with a casing made of seamless steel tubing.

When these parts are assembled they are autogenously welded together by acetylene, electric, or other methods of welding and they are thereby united in such a manner that they are substantially integral, as shown in Fig. III. The shank 5 is autogenously united to the casing 4 which in turn is similarly united to the plug 2. With the parts so united there are no joints which will work loose and expose the heating element to moisture and dirt; there are no acids present to corrode the joints or damage the heating element; and there is no danger of the iron parts separating and exposing the heating element when the iron is subjected to rough, careless usage in practical work.

The iron is provided with a handle 7 which is adjustably secured to the shank 5. The handle is of any suitable form to inclose the terminal block 6 and form a suitable grip for manipulating the iron. The supply conductors are passed through an opening in the end of the handle and are attached to binding screws 13 on the terminal block 6.

Fig. IV shows a form of construction used for small sizes of irons. The shank and casing are made in one piece which is attached directly to the flange 10 on the stud 2. When the parts are united a substantially integral structure of uniform diameter is obtained.

Fig. V shows a further modification in which the body is made in four parts. The shank 5 is welded in an opening in a washer 14 which in turn is welded to the casing 4. This construction is desirable in large sizes of irons.

It will thus be seen that by constructing the iron in the general manner shown from similar materials and by autogenously welding the parts together a soldering iron is provided which possesses many desirable qualities, and marks a step in advance in the art. The iron is rugged and serviceable and devoid of joints which, if present, would corrode and deteriorate. The parts are united so that when the iron is completed a substantially integral structure is obtained. The heating means is thoroughly protected against damage by rough usage, by soldering acids, or by water. The iron may be quickly and easily manufactured and assembled and is therefore comparatively inexpensive.

It should be understood that the structure shown and described is for purposes of illustration only and that other structures may be devised which embody the invention and which come within the spirit and scope of the appended claims.

What I claim and desire to secure by Letters Patent is:

1. An electric soldering iron or the like having a heating stud, electrical heating means surrounding the same, and a casing surrounding said heating means, said casing and stud being made of similar materials and autogenously united.

2. An electric soldering iron having a heating stud, electrical heating means surrounding the same, a casing surrounding said heating means, and a shank for the casing, said shank, casing and stud being made of similar materials, the casing being autogenously united with the stud, and the shank being autogenously united with the casing.

3. An electric soldering iron having a longitudinal heating stud, a soldering tip associated therewith, a flange on said stud, an electrical heating element surrounding said stud, and a casing surrounding said heating element, said casing and stud being made of similar materials, and the casing being autogenously united with the flange.

4. An electric soldering iron having a longitudinal stud, a soldering tip associated therewith, a flange on said stud, electrical heating means surrounding the stud, a casing surrounding said heating means, and a shank associated with said casing, said stud, casing and shank being made of similar materials, the casing being autogenously united with said flange on the stud, and the shank being autogenously united with the casing.

5. A heating appliance having a heating tip for applying heat to the work, a heating stud for conducting heat to said tip, an electrical heater surounding said stud, and a casing surrounding said heater, said casing and stud being secured together by autogenously united surfaces of similar metals.

In witness whereof, I have hereunto subscribed my name in the presence of two witnesses.

EDWIN N. LIGHTFOOT.

Witnesses:
G. P. BROCKWAY,
C. F. BARNECOTT.